US012673567B1

(12) United States Patent
Esmaeilian et al.

(10) Patent No.: US 12,673,567 B1
(45) Date of Patent: Jul. 7, 2026

(54) POWER CONVERTER WITH DARK START PRECHARGE CIRCUIT

(71) Applicant: dcbel Inc., Montréal (CA)

(72) Inventors: Hamidreza Esmaeilian, Ottawa (CA); Olivier Raymond-Dubois, Montréal (CA); Ernest Montllo Casabayo, Montréal (CA)

( * ) Notice: Subject to any disclaimer, the term of this patent is extended or adjusted under 35 U.S.C. 154(b) by 0 days.

(21) Appl. No.: 19/403,115

(22) Filed: Nov. 27, 2025

Related U.S. Application Data

(60) Provisional application No. 63/768,296, filed on Mar. 7, 2025.

(51) Int. Cl.
| | |
|---|---|
| *H02J 7/00* | (2026.01) |
| *B60L 53/18* | (2019.01) |
| *B60L 55/00* | (2019.01) |
| *H02M 1/36* | (2007.01) |

(52) U.S. Cl.
CPC .............. *B60L 53/18* (2019.02); *B60L 55/00* (2019.02); *H02M 1/36* (2013.01); *B60L*

*2210/14* (2013.01); *B60L 2210/30* (2013.01); *B60L 2210/42* (2013.01); *B60L 2270/147* (2013.01)

(58) Field of Classification Search
None
See application file for complete search history.

(56) References Cited

U.S. PATENT DOCUMENTS

| | | | |
|---|---|---|---|
| 2010/0090626 A1* | 4/2010 | King | B60L 50/15 307/77 |
| 2018/0278168 A1* | 9/2018 | Brown | H02J 7/02 |
| 2023/0378770 A1* | 11/2023 | Ijaz | H02J 1/08 |

\* cited by examiner

*Primary Examiner* — Arun C Williams
(74) *Attorney, Agent, or Firm* — Anglehart et al.

(57) ABSTRACT

The present disclosure provides a bidirectional power converter comprising dark start precharge circuit capable of receiving low-voltage DC power and boosting it to the target voltage specified by charge data of a BMS associated with an EV battery. Dark start precharge circuit allows to further establish a power connection with the EV and draw DC power from the EV battery to supply power to electrical loads of a household in absence of AC power at the AC power mains.

18 Claims, 13 Drawing Sheets

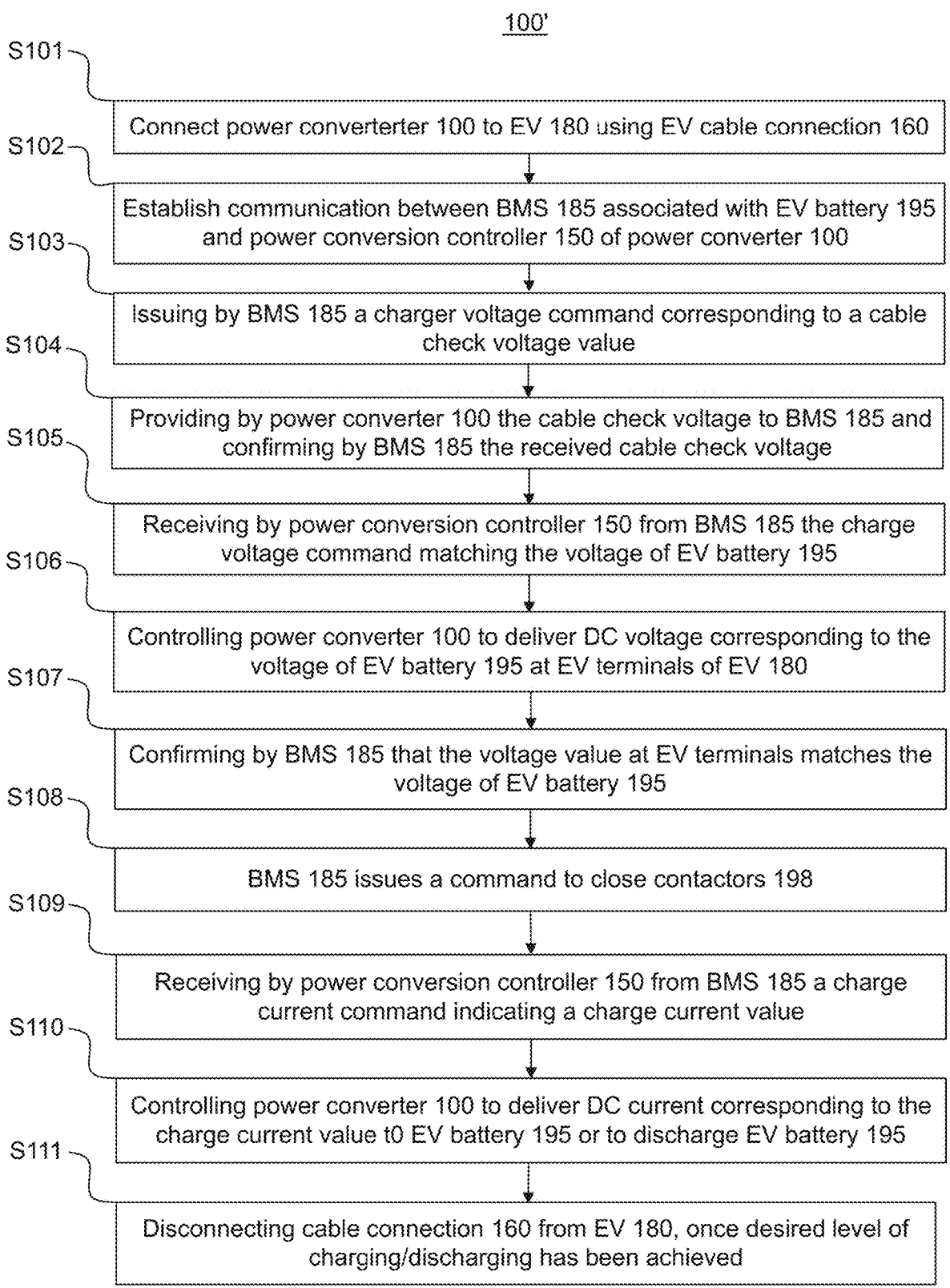

100'

S101 — Connect power converterter 100 to EV 180 using EV cable connection 160

S102 — Establish communication between BMS 185 associated with EV battery 195 and power conversion controller 150 of power converter 100

S103 — Issuing by BMS 185 a charger voltage command corresponding to a cable check voltage value S104 — Providing by power converter 100 the cable check voltage to BMS 185 and confirming by BMS 185 the received cable check voltage S105 — Receiving by power conversion controller 150 from BMS 185 the charge voltage command matching the voltage of EV battery 195

S106 — Controlling power converter 100 to deliver DC voltage corresponding to the voltage of EV battery 195 at EV terminals of EV 180

S107 — Confirming by BMS 185 that the voltage value at EV terminals matches the voltage of EV battery 195

S108 — BMS 185 issues a command to close contactors 198

S109 — Receiving by power conversion controller 150 from BMS 185 a charge current command indicating a charge current value S110 — Controlling power converter 100 to deliver DC current corresponding to the charge current value t0 EV battery 195 or to discharge EV battery 195

S111 — Disconnecting cable connection 160 from EV 180, once desired level of charging/discharging has been achieved FIG. 1B (Prior Art)

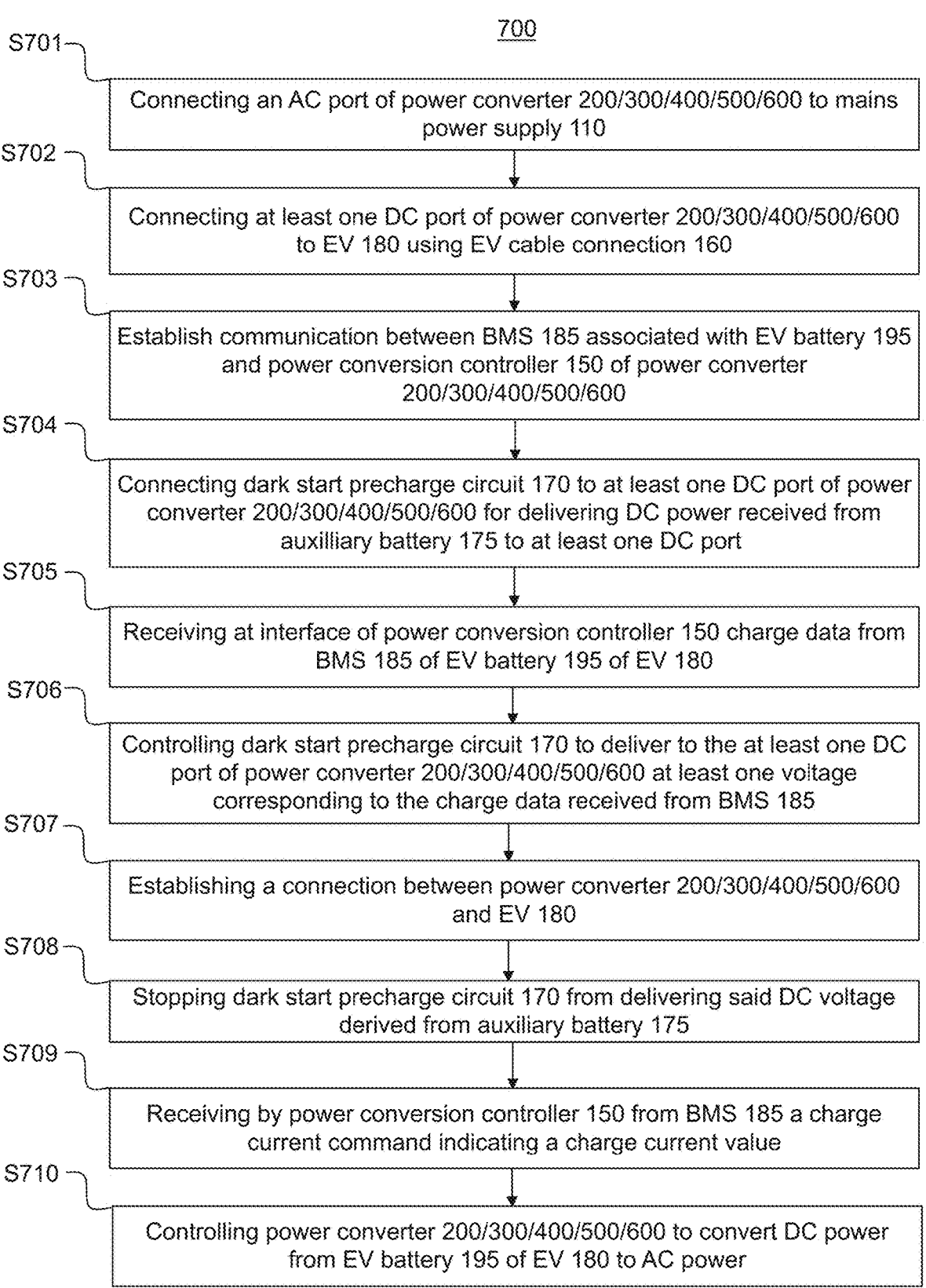

700

S701 — Connecting an AC port of power converter 200/300/400/500/600 to mains power supply 110

S702 — Connecting at least one DC port of power converter 200/300/400/500/600 to EV 180 using EV cable connection 160

S703 — Establish communication between BMS 185 associated with EV battery 195 and power conversion controller 150 of power converter 200/300/400/500/600

S704 — Connecting dark start precharge circuit 170 to at least one DC port of power converter 200/300/400/500/600 for delivering DC power received from auxilliary battery 175 to at least one DC port S705 — Receiving at interface of power conversion controller 150 charge data from BMS 185 of EV battery 195 of EV 180

S706 — Controlling dark start precharge circuit 170 to deliver to the at least one DC port of power converter 200/300/400/500/600 at least one voltage corresponding to the charge data received from BMS 185

S707 — Establishing a connection between power converter 200/300/400/500/600 and EV 180

S708 — Stopping dark start precharge circuit 170 from delivering said DC voltage derived from auxiliary battery 175

S709 — Receiving by power conversion controller 150 from BMS 185 a charge current command indicating a charge current value S710 — Controlling power converter 200/300/400/500/600 to convert DC power from EV battery 195 of EV 180 to AC power

FIG. 7

POWER CONVERTER WITH DARK START PRECHARGE CIRCUIT

This patent application claims priority to U.S. provisional patent application Ser. No. 63/768,296, filed Mar. 7, 2025, the contents of which are incorporated herein by reference.

TECHNICAL FIELD

The present invention relates to the field of power conversion technology, and more particularly to Vehicle-to-Home (V2H) power conversion, such as bidirectional power conversion systems used in EV charging infrastructure and enabling controlled energy transfer in a Vehicle-to-Home (V2H) setting.

BACKGROUND

This section is intended to provide a background or context to the invention that is recited in the claims. The description provided herein may include concepts that could be pursued but are not necessarily ones that have been previously conceived or pursued. Therefore, unless otherwise indicated herein, what is described in this application and claims in this application and is not admitted to be prior by inclusion of this section.

As electric vehicles (EVs) become more advanced, they are increasingly being used not only for transportation, but as also as an energy storage system. One of the most promising applications of EVs is Vehicle-to-Home (V2H) power transfer, which allows to transfer DC power from the EV battery to home in off-grid or grid-tied modes. For example, in off-grid mode, i.e., in case of a power outage, V2H power transfer capability of EVs allows to supply electricity to essential appliances of a household.

It is known in the art that V2H functionality relies on a bidirectional EV charger, which enables power flow from the EV battery to home's electrical system. In normal conditions, i.e., in grid-tied mode, the EV battery draws power from the grid in order to be charged.

In order to draw power from the EV battery, the power conversion controller, which may be typically comprised within a bidirectional EV charger, may communicate with a battery management system (BMS) of the EV battery using a suitable communication protocol (CHAdeMO, CCS, SAE J2411, etc.), in order to establish a connection between the EV and the EV charger and receive from the battery management system (BMS) of the EV battery a charge voltage command comprising a target charge voltage required by an EV. According to commonly used current standards for DC charging of an EV, the connection to the charger is controlled by the EV and involves communication between the charger and the EV. The steps to do this are as follows. First, there is a cable check phase, which requires to apply high DC voltage to the charge cable to ensure it provides enough insulation between its conductors and is therefore safe to use. This voltage may be between 400 to 500 V (or higher). The EV senses the applied voltage. Second, the EV sends data to the charger specifying a voltage to be applied to the EV so that there is no inrush (or outrush) current at the time of connection. This also prevents any significant sparking at the contactors which could shorten their lifespan. This is the voltage match phase. When the EV senses that the voltage applied from the charger is as requested, the EV will then close the contactors so that the charger is then connected to the EV battery. After this point, if the charger draws power instead of supplying the charge voltage requested by the BMS, the EV does not disconnect the charger.

When a power outage occurs, an EV charger that is already connected to an EV may switch to an island mode, which implies that DC power stored in the EV battery may then be converted to AC power using a bidirectional EV charger operating in the inverter mode, making it compatible with home electrical loads and ensuring that energy flows only within home and does not back feed into the grid, which is crucial for safety.

However, when a charger is not connected to the EV when the mains power supply goes down, establishing an electrical connection between an EV and the home is not possible since there is no AC power to drive the power converter to supply the required DC voltages requested by the EV to establish a connection.

SUMMARY

Since powering up home's electrical system in case of a power outage, as well as in absence of any other additional power supply or power storage system, the Applicant has invented a bidirectional power converter and a method to operate the bidirectional power converter, allowing to establish a connection between a bidirectional EV charger and an EV, for drawing DC power from the EV battery, converting it to AC power and delivering it home's electrical system.

In one embodiment, a bidirectional power converter for converting AC power to DC charging power for an electric vehicle (EV) and for converting DC power from the EV to AC power, the bidirectional power converter may comprise: (i) at least one bidirectional AC-to-DC power conversion module having an AC port connectable to mains power supply in a grid-tie or island mode and at least one DC port connectable to at least one EV cable connection; (ii) a dark start precharge circuit for delivering DC voltage derived from an auxiliary battery to the at least one DC port in the absence of AC power at the AC port; and (iii) a power conversion controller, which may have an interface for receiving charge data from a battery management system (BMS) associated with an electric power storage battery of the EV, the power conversion controller may be operatively connected to the at least one bidirectional AC-to-DC power conversion module for: (1) when the AC power is available at the AC port, controlling the at least one bidirectional AC-to-DC power conversion module to deliver to the DC port at least one voltage according to the charge data received from the BMS so as to establish a connection to the EV and then begin charging or discharging the electric power storage battery of the EV; and (2) when the AC power is not available at the AC port, controlling the dark start precharge circuit to deliver to the DC port at the at least one voltage corresponding to the charge data at the at least one DC port to establish a connection to the EV and, in response to detecting that the connection to the EV is established, stopping the dark start precharge circuit from delivering the DC voltage derived from the auxiliary battery, and controlling the at least one bidirectional AC-to-DC power conversion module to convert DC power from the EV to AC power.

In some embodiments, the at least one bidirectional AC-to-DC power conversion module of the bidirectional power converter may further comprise a DC-to-DC power conversion stage.

In some embodiments, the DC-to-DC power conversion stage of the at least one bidirectional AC-to-DC power conversion module may comprise galvanic isolation.

In some embodiments, the dark start precharge circuit may comprise a low-voltage input DC port for receiving a low-voltage DC power from the auxiliary battery.

In some embodiments, the dark start precharge circuit may further comprise a step-up DC-to-DC power conversion stage for stepping up the low-voltage DC power received from the auxiliary battery to match a target voltage corresponding to the charge data.

In some embodiments, the dark start precharge circuit may comprise a low-voltage input DC port for receiving a low-voltage DC power from the auxiliary battery, wherein the low-voltage input DC port may be connectable to the step-up DC-to-DC power conversion stage for boost and delivery to the at least one DC port.

In some embodiments, the DC-to-DC power conversion stage may comprise a first DC side connectable to the AC-to-DC power conversion stage and a second DC side, which may have the at least one DC port further connectable to the EV connection, and wherein a DC side of the AC-to-DC power conversion stage further comprises a connection to DC link and bus capacitors, the DC link and bus capacitors connectable to the first side of the DC-to-DC power conversion stage.

In some embodiments, the DC power provided by the step-up DC-to-DC power conversion stage may be used to charge the DC link and bus capacitors allowing to provide the target voltage at the DC port of the at least one bidirectional AC-to-DC power conversion module.

In some embodiments, the at least one DC port of the bidirectional AC-to-DC power conversion module may further comprise a connection to an electromagnetic compatibility (EMC) filter, protection and precharge circuit.

In some embodiments, the dark start precharge circuit may be connectable to the EMC filter, protection and precharge circuit for filtering the DC power provided by said step-up DC-to-DC power conversion stage before providing the DC power to the EV.

A method for delivering power between an electric power storage battery of an electric vehicle (EV) and at least one power conversion module of a power converter may comprise: (1) connecting an AC port of the at least one power conversion module to mains power supply, the mains power supply may be in a grid-tie or island mode; (2) connecting at least one DC port of the at least one power conversion module to at least one EV cable connection; (3) connecting a dark start precharge circuit to at least one DC port of the power converter for delivering DC power, which may be delivered from an auxiliary battery to the at least one DC port; (4) receiving at an interface of a controller charge data from a battery management system (BMS) associated with the electric power storage battery of the EV, wherein the controller may be operatively connected to the at least one power conversion module for, when the AC power is not available at the AC port, controlling the dark start precharge circuit to deliver to the at least one DC port at the at least one voltage corresponding to the charge data at the at least one DC port to establish a connection to the EV and, in response to detecting that the connection to the EV is established, stopping the dark start precharge circuit from delivering the DC voltage derived from the auxiliary battery, and controlling the at least one power conversion module to convert DC power from the EV to AC power.

In some embodiments, controlling the dark start precharge circuit may further comprise controlling a step-up DC-to-DC power conversion stage of the dark start precharge circuit using the controller for stepping up the DC power provided by the auxiliary battery, wherein the controller may be provided by power conversion controller of the power converter.

In some embodiments, controlling the dark start precharge circuit may further comprise controlling a DC-to-DC power conversion stage of the at least one power conversion module using the controller for stepping up the DC power derived from the auxiliary battery. It may be appreciated that DC-to-DC power conversion stage may be galvanically isolated and may compriss a first DC side connectable to a DC side of the at least one power conversion module and a second DC side connectable to the at least one EV cable connection. Furthermore, the controller may be provided by power conversion controller of the power converter.

In some embodiments, delivering the DC power at the target voltage corresponding to the charge data at the at least one DC port may further comprise charging DC link and bus capacitors connected to the at least one DC port of the DC side of the at least one power conversion module using the step-up DC-to-DC power conversion stage of the dark start precharge circuit.

In some embodiments, the method may further comprise providing the DC power stored in the DC link and bus capacitors to the DC-to-DC power conversion stage of the at least one power conversion module for further tunning allowing to achieve the target voltage corresponding to the charge data.

In some embodiments, the method may further comprise providing the DC power to an electromagnetic compatibility (EMC) filter, protection and precharge circuit connected the at least one DC port of the at least one power conversion module.

In some embodiments, the charge data issued by the BMS may contain a charge voltage command, for establishing a connection between the EV and the power converter, and at least one charge current command, for transferring DC power between the EV and the power converter after the connection is established.

In one embodiment, an inverter for converting DC power from an electric vehicle (EV) to AC power may comprise: (1) at least one inverter module having an AC port connectable to mains power supply in a grid-tie or island mode and at least one DC port connectable to at least one EV cable connection; (2) a dark start precharge circuit for delivering DC voltage derived from an auxiliary battery to the at least one DC port; and (3) a controller having an interface for receiving charge data from a battery management system (BMS) associated with an electric power storage battery of the EV, the controller may be operatively connected to the at least one inverter module for, when the AC power is not available at the AC port, controlling the dark start precharge circuit to deliver to the DC port at the at least one voltage corresponding to the charge data at the at least one DC port to establish a connection to the EV and, in response to detecting that the connection to the EV is established, stopping the dark start precharge circuit from delivering the DC voltage derived from an auxiliary battery, and controlling the at least one inverter module to convert DC power from the EV to AC power.

BRIEF DESCRIPTION OF THE DRAWINGS

The invention will be better understood by way of the following detailed description of embodiments of the invention with reference to the appended drawings, in which.

5

Figure 2A:
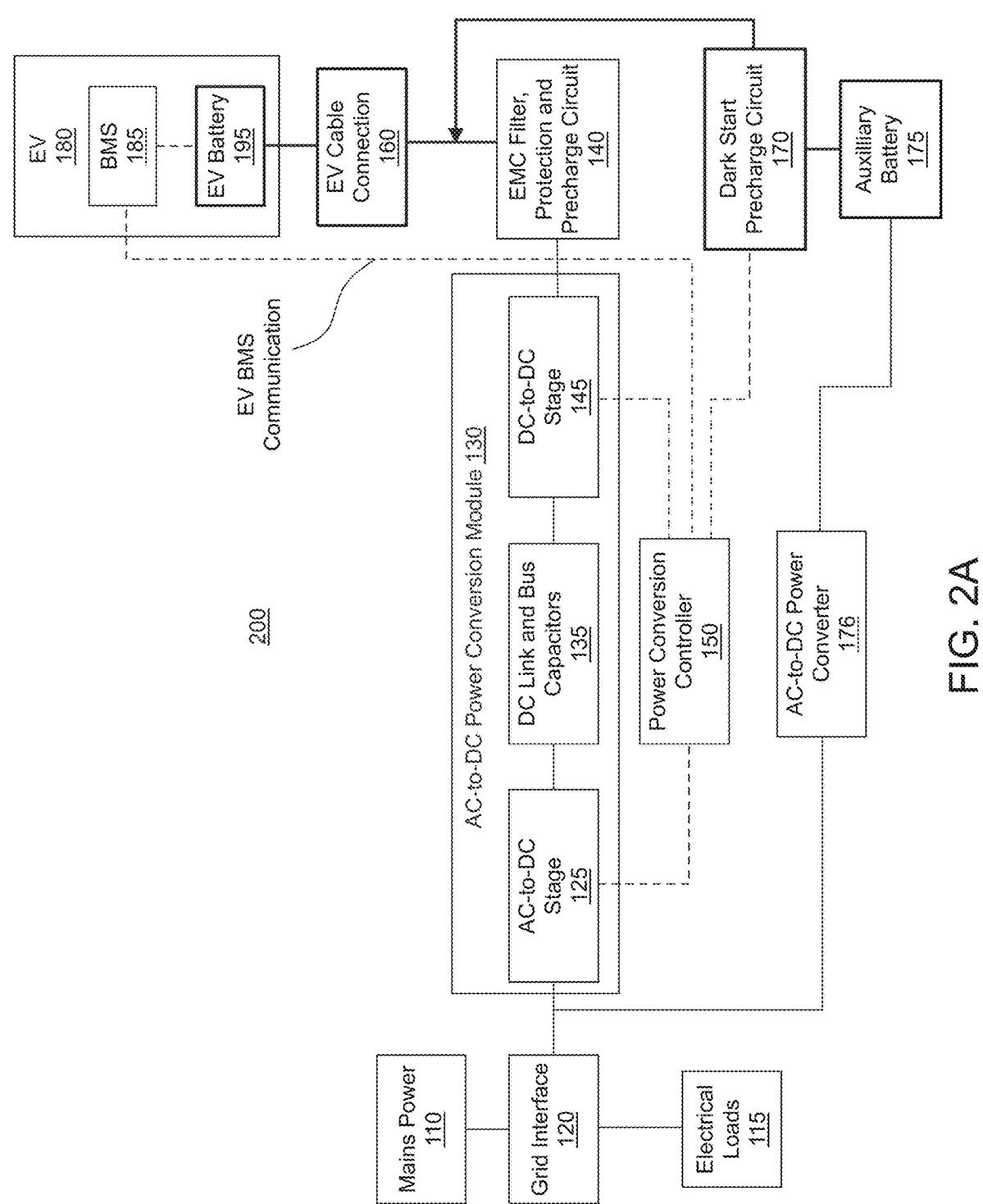
Figure 2B:
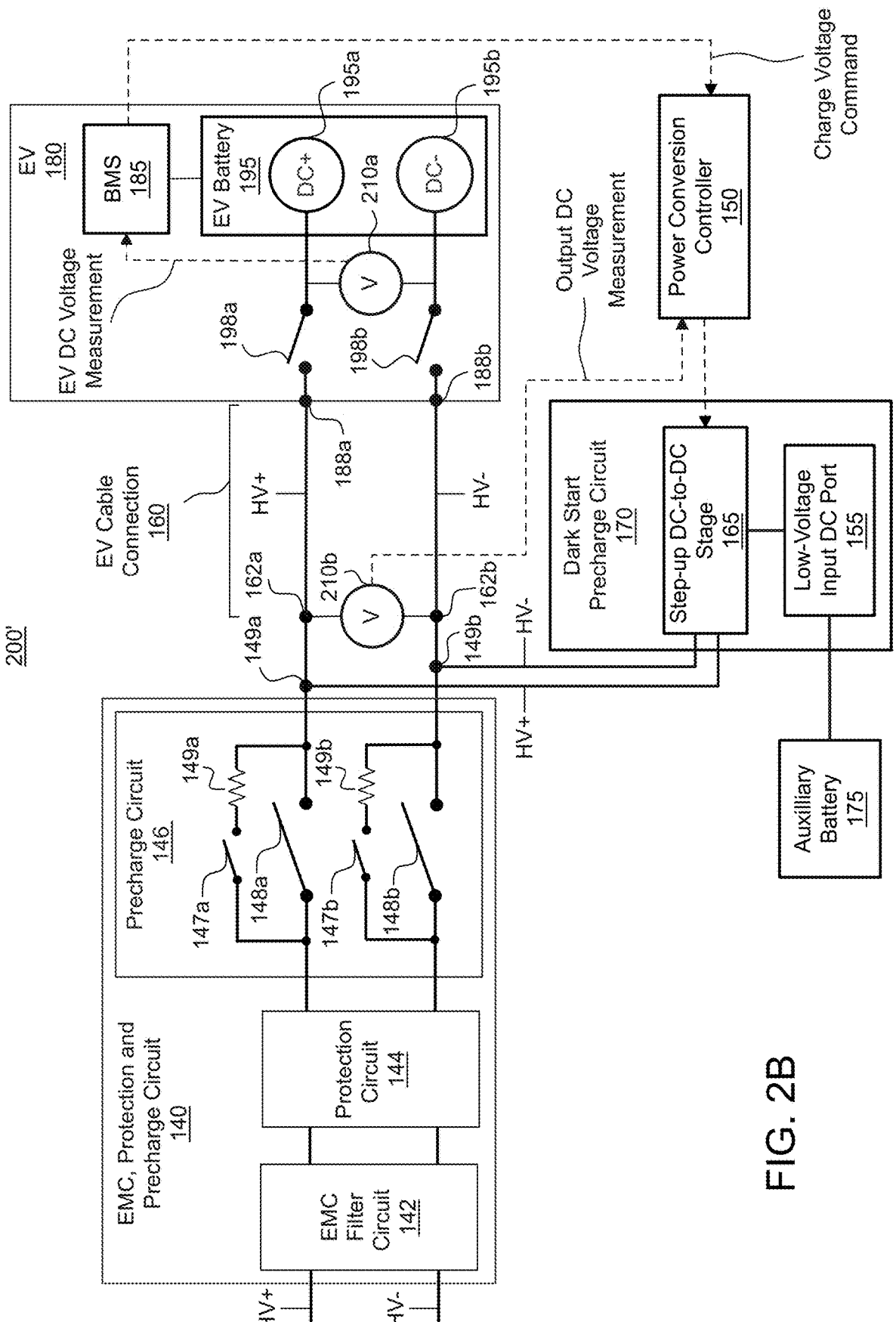
Figure 2C:
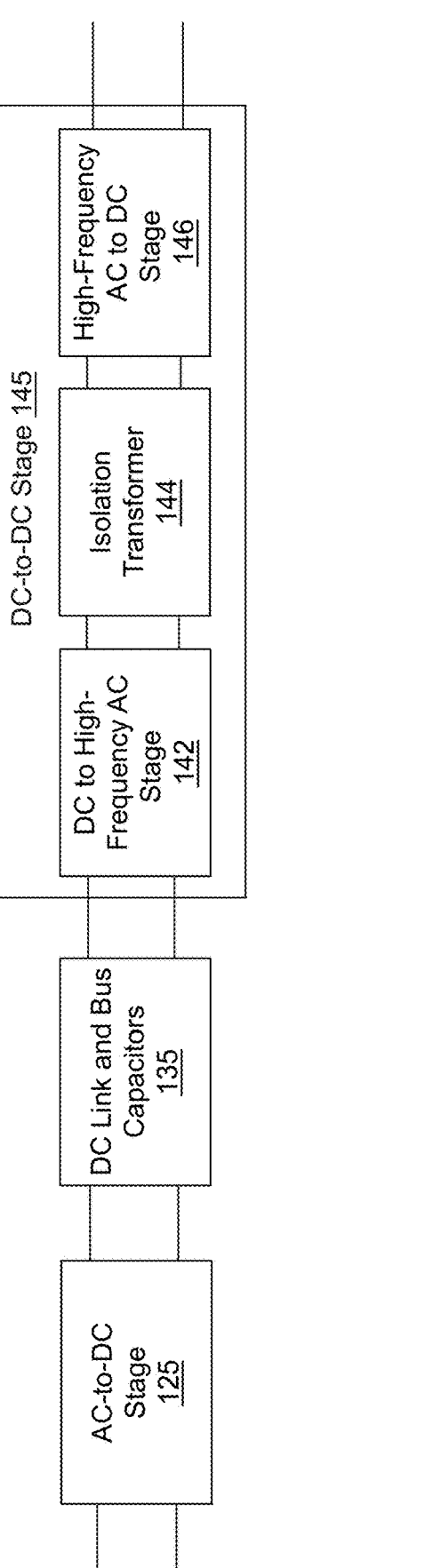
Figure 3A:
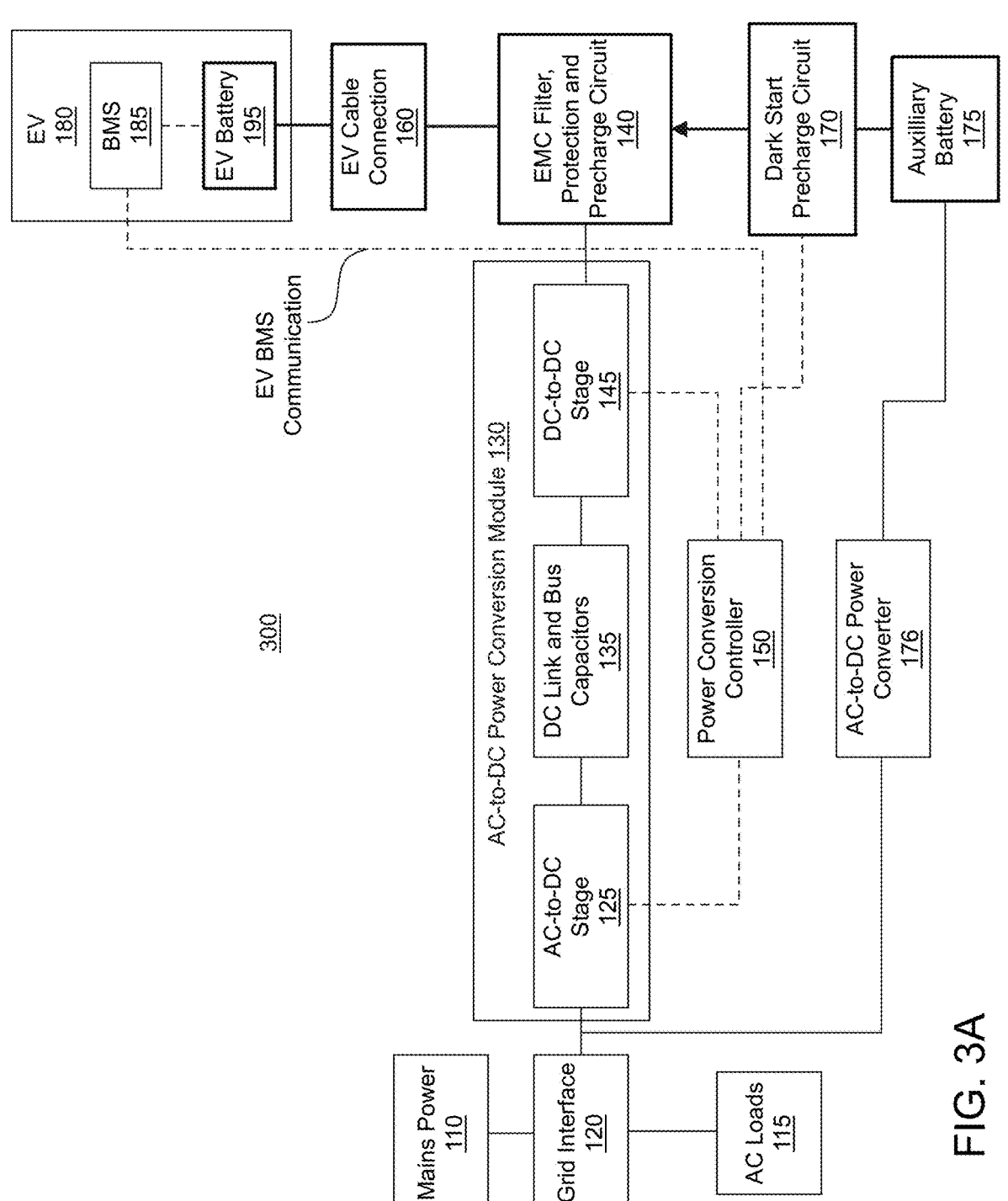
Figure 3B:
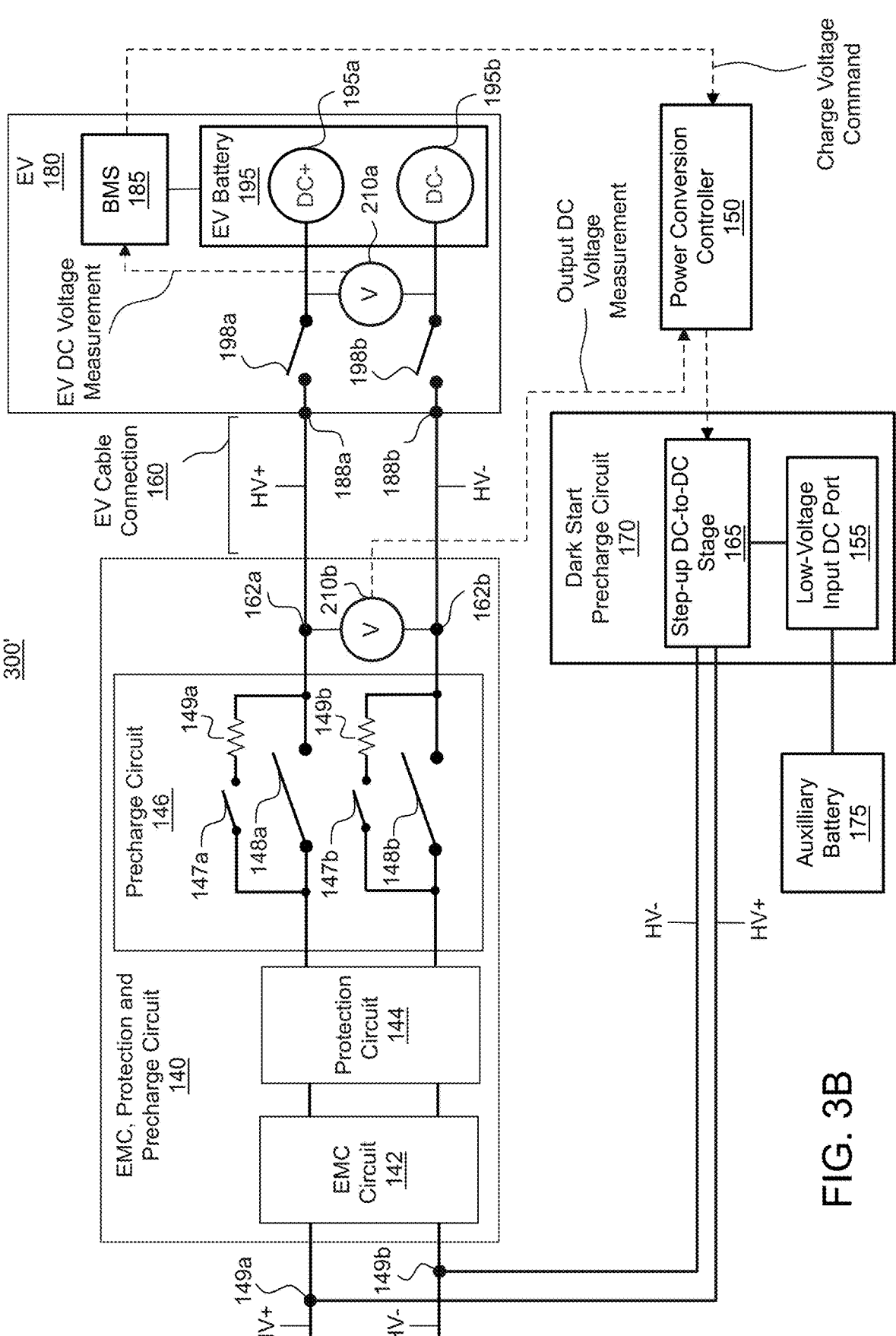
Figure 4A:
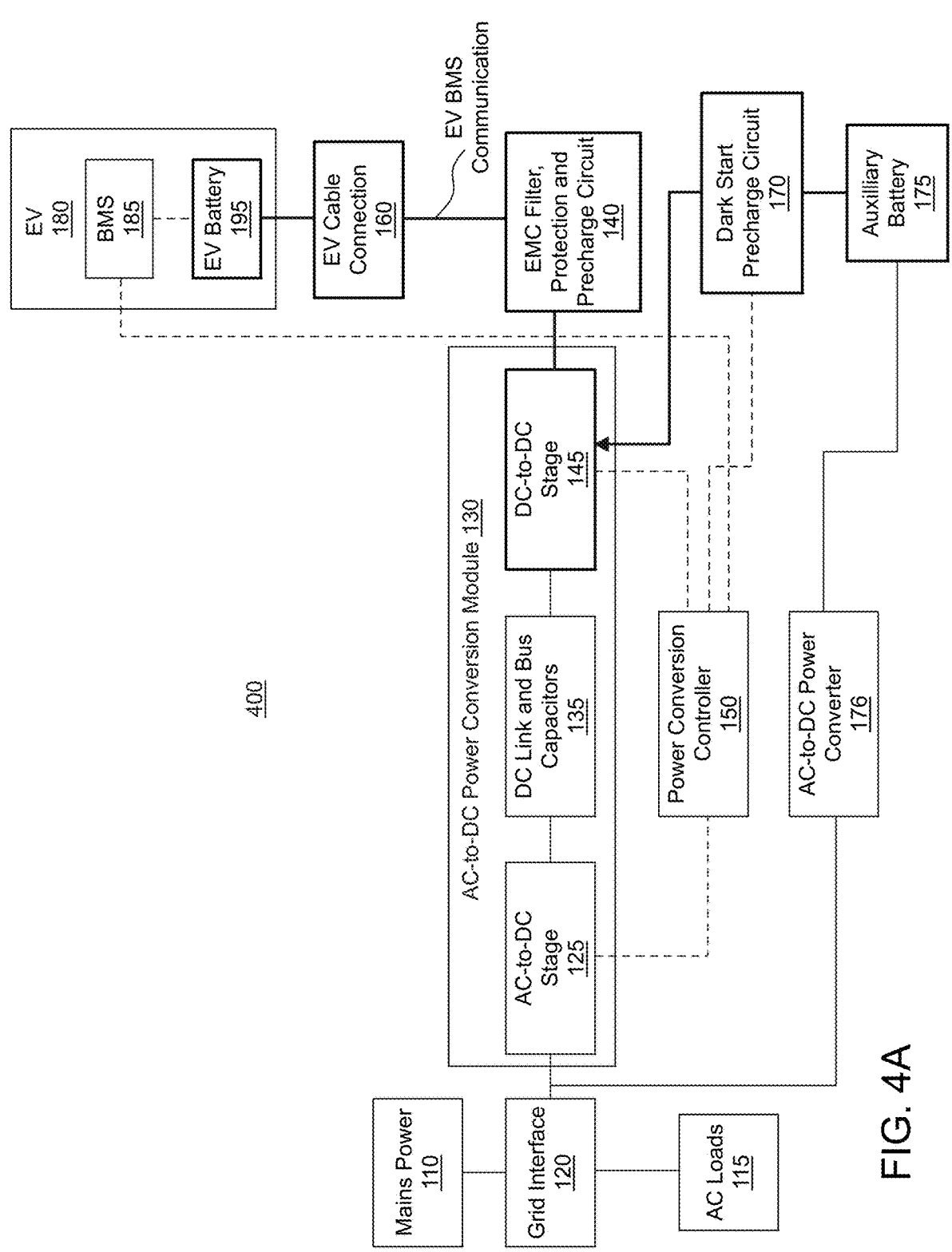
Figure 4B:
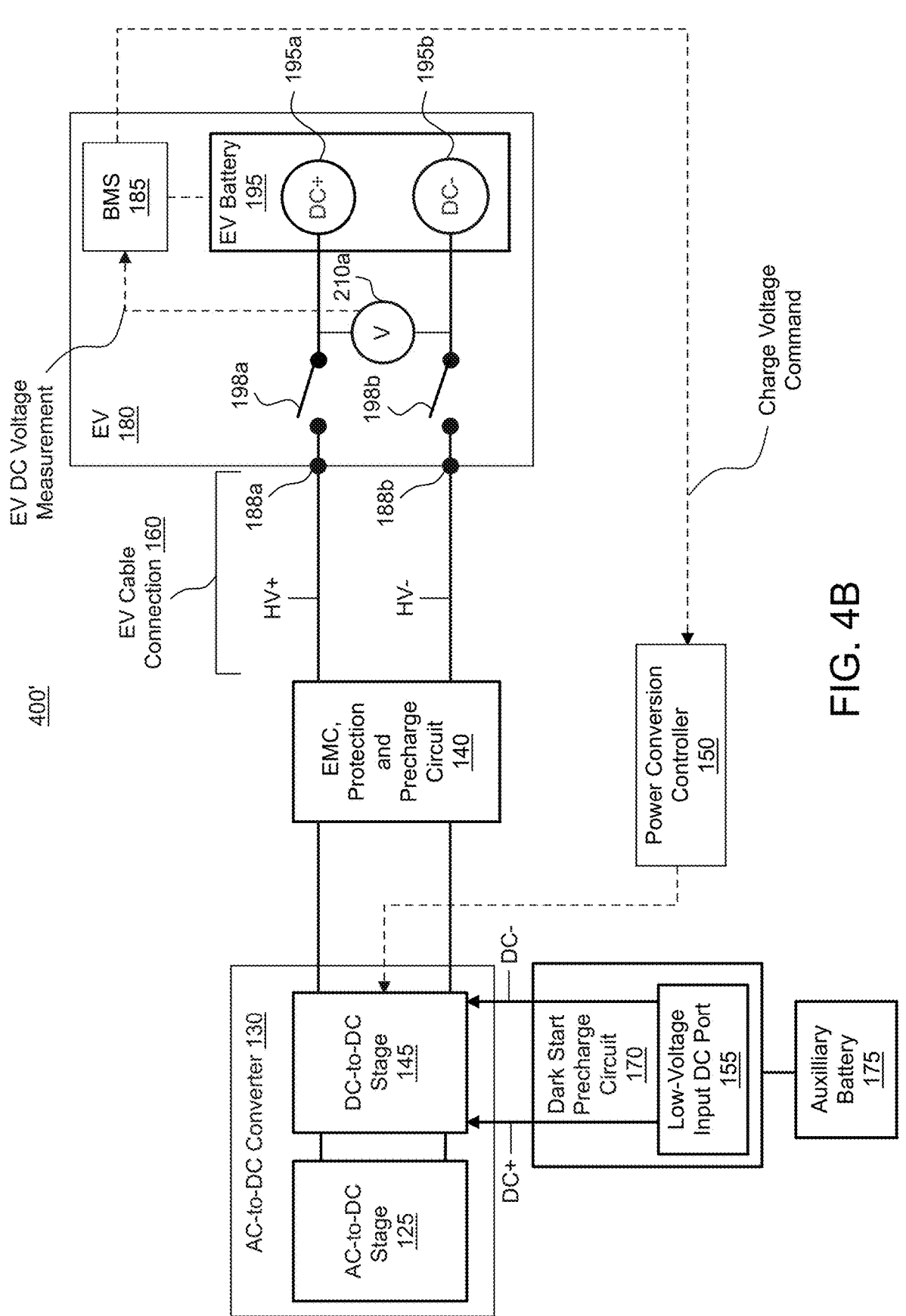
Figure 5A:
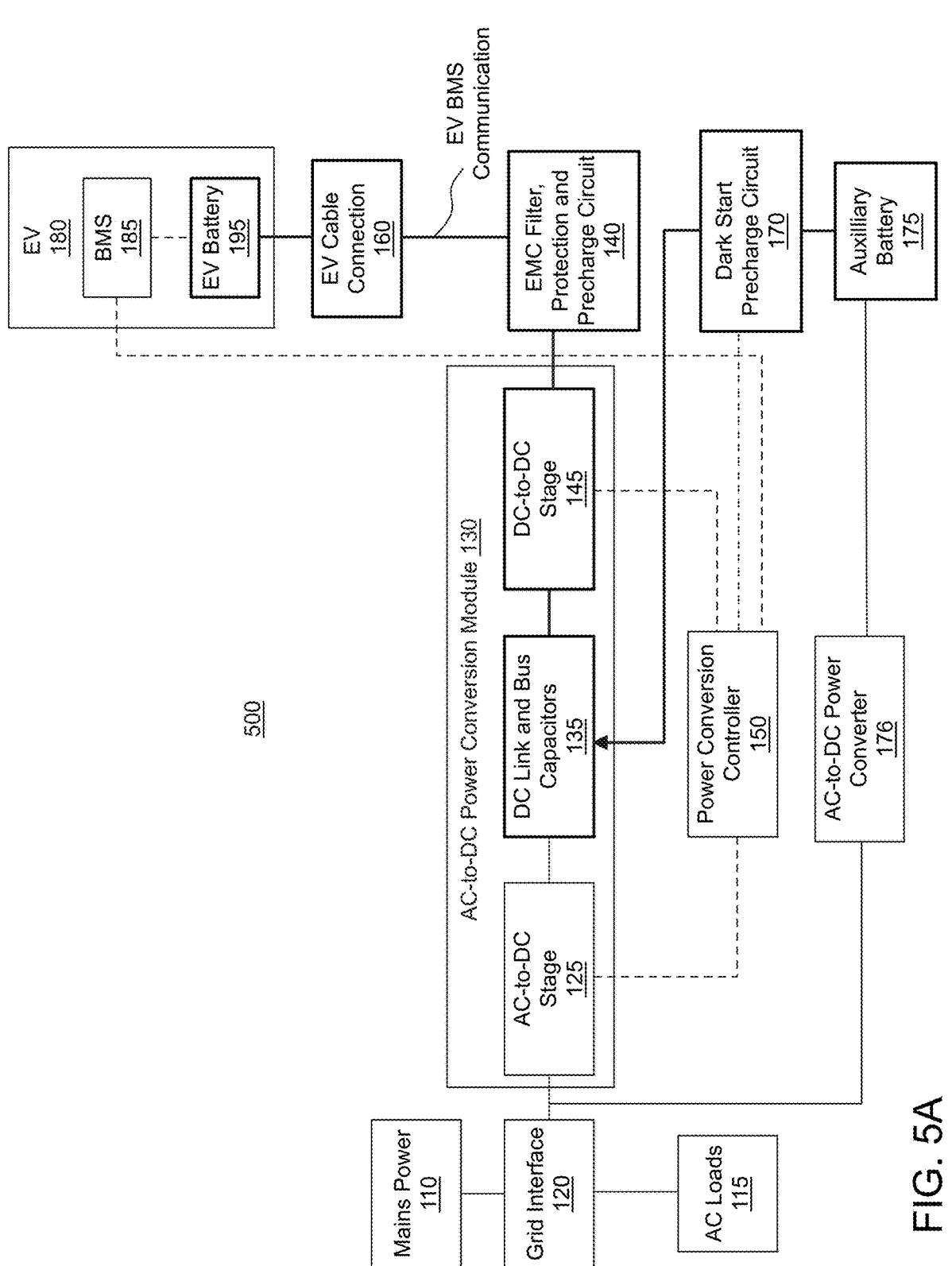
Figure 5B:
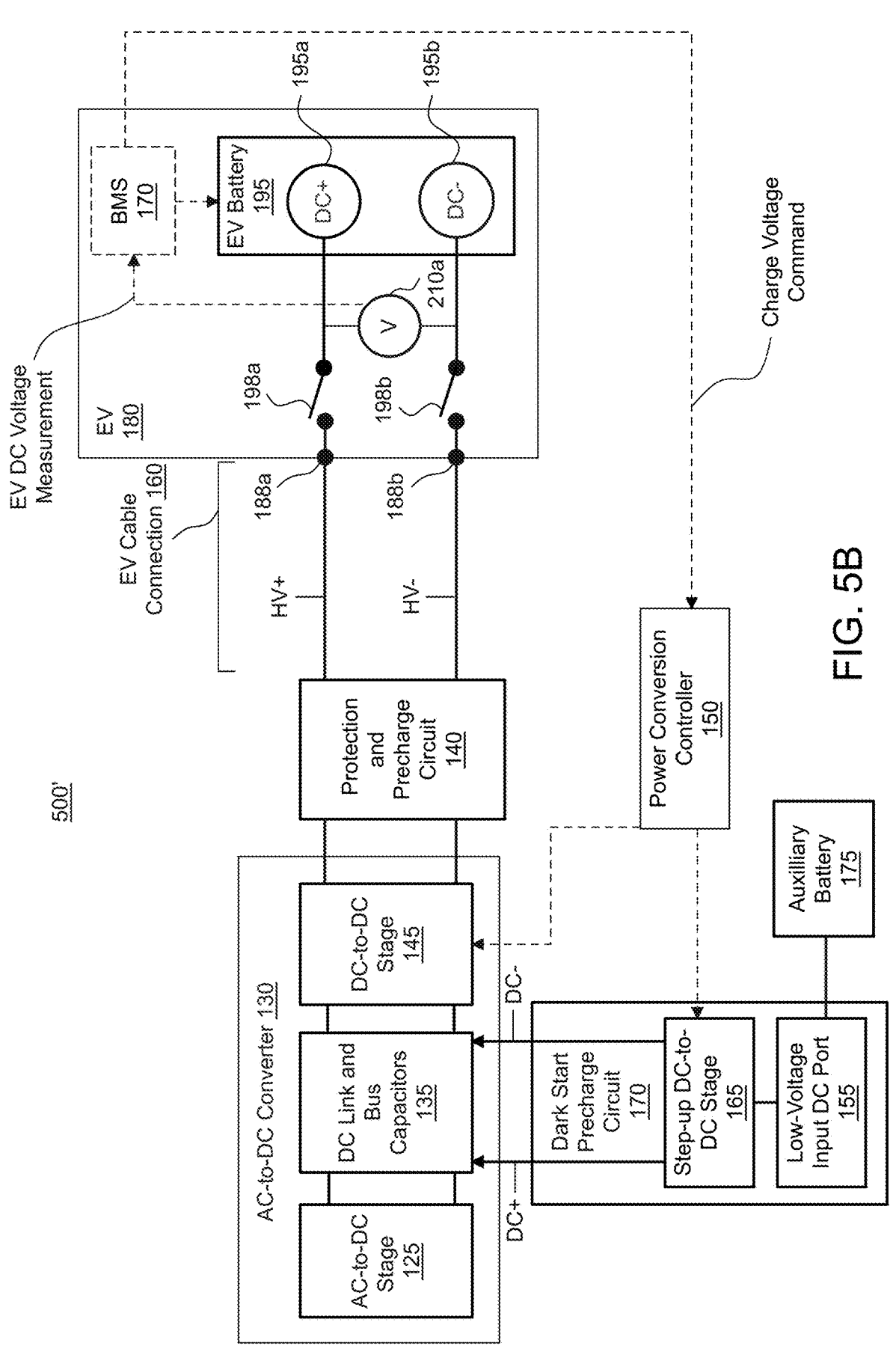
Figure 6:
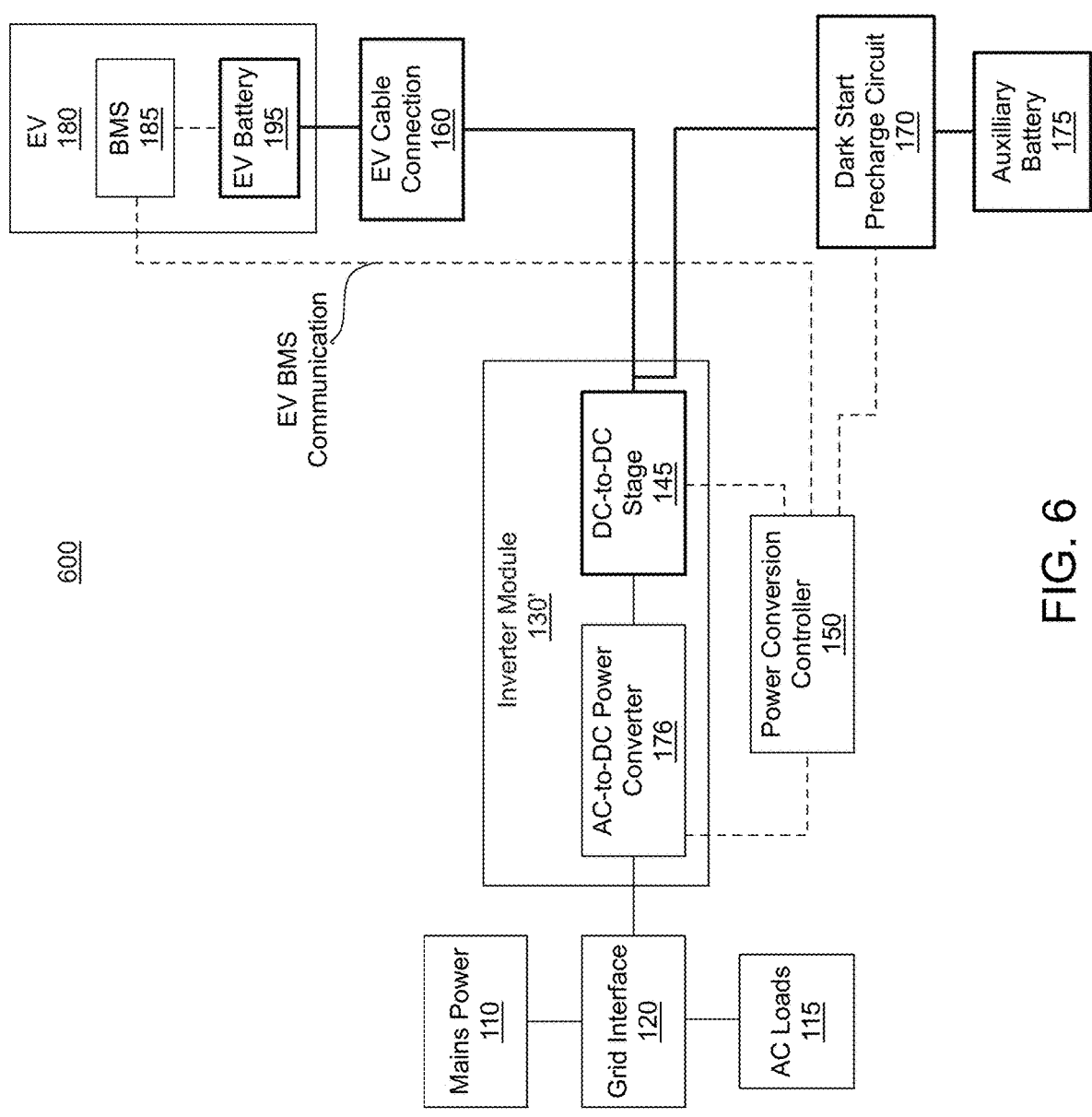

FIG. 1B schematically illustrates a flowchart of known in the art power converter operation, further comprising communication between a power converter and the BMS of an EV, in order to charge or discharge the battery of an EV;

FIG. 2A schematically illustrates an embodiment of a bidirectional power converter comprising a dark start precharge circuit, which may be connected to the DC terminals of EMC filter, protection and precharge circuit in order to be further supplied through an EV cable connection to an EV battery;

FIG. 2B schematically illustrates a detailed view of a power flow in the bidirectional power converter illustrated in FIG. 2A, wherein the DC output of the dark start precharge circuit may be provided directly to EV cable connection;

FIG. 2C schematically illustrates an AC-to-DC power conversion module having a DC-to-DC power conversion stage, wherein the DC-to-DC power conversion stage may comprise galvanic isolation provided by an isolation transformer;

FIG. 3A schematically illustrates an alternative embodiment of a bidirectional power converter comprising the dark start precharge circuit, which may be connected directly to an EMC filter, protection and precharge circuit;

FIG. 3B schematically illustrates a detailed view of a power flow in the bidirectional power converter illustrated in FIG. 3A, wherein the boosted DC power from the dark start precharge circuit may be passed through electromagnetic compatibility (EMC) filter, protection and precharge circuit before being supplied to EV;

FIG. 4A schematically illustrates an alternative embodiment of a bidirectional power converter comprising the dark start precharge circuit, which may be connected directly to the DC-to-DC conversion stage of a bidirectional AC-to-DC power conversion module, allowing the output DC voltage of the dark start precharge circuit to be boosted to a target voltage (i.e., at least one voltage requested by the BMS associated with the EV of an EV) according to charge data of the BMS using the DC-to-DC conversion stage;

FIG. 4B schematically illustrates a detailed view of a power flow in the bidirectional power converter illustrated in FIG. 4A, wherein the low-voltage DC power received at low-voltage input DC port of the dark start precharge circuit may be provided to the DC-to-DC power conversion stage of the AC-to-DC power conversion module for further boosting;

FIG. 5A schematically illustrates an alternative embodiment of the bidirectional power converter comprising the dark start precharge circuit, which may be connected directly to a DC link and bus capacitors;

FIG. 5B schematically illustrates a detailed view of a power flow in the bidirectional power converter illustrated in FIG. 5A, wherein the dark start precharge circuit may comprise a low-voltage input DC port and a step-up DC-to-DC power conversion stage, allowing to charge DC link and bus capacitors, and then tune and filter DC voltage provided by the DC link and bus capacitors using DC-to-DC power conversion stage and EMC filter, protection and precharge circuit;

FIG. 6 schematically illustrates an inverter comprising the dark start precharge circuit; and FIG. 7 schematically illustrates a flowchart of operation of bidirectional power converter (operating as an inverter) and an inverted disclosed herein.

DETAILED DESCRIPTION

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Reference throughout this description to "one embodiment", "an embodiment", or similar language means that a particular feature, structure, or characteristic describe in connection with the embodiment is included in at least one embodiment of the present invention. Thus, appearances of the phrases "in one embodiment", "in an embodiment", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of invention. Thus, it is intended that the present invention covers the modifications and variations of this invention provided they come within the scope of the appended claims and their equivalents. Reference will now be made in detail to the preferred embodiments.

It may be appreciated that in the drawings supporting this description, more specifically, in the block diagrams and circuit diagrams schematically illustrating electric circuits, solid lines may correspond to power connections between circuit elements, and dashed lines may correspond to data exchange and control commands.

Figure 1A:
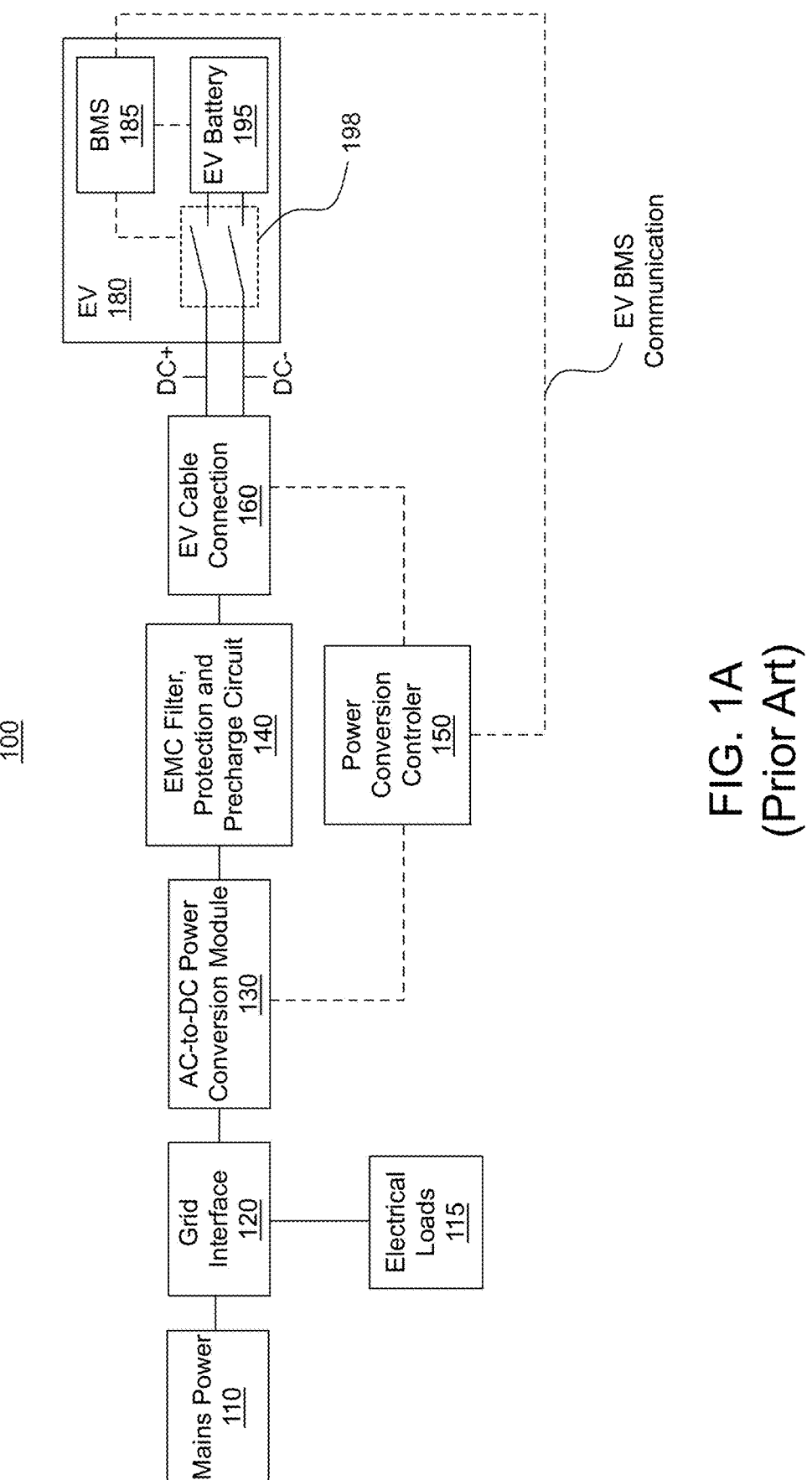
FIG. 1A schematically illustrates a power converter known in the prior art.

FIG. 1A schematically illustrates a power converter 100 know in the art may comprise grid interface 120, which may be connected to mains power supply 110 and is essential for power distribution and consumption, may ensure that power source synchronizes with the frequency, voltage, and phase of mains power supply 110, which is essential for power generation and distribution. Grid interface 120 may distribute AC power to electrical loads 115, such, as for example, home appliances, lights, etc., and may further be connected to at least one AC-to-DC power conversion module 130. It may be appreciated that AC-to-DC power conversion module 130, which may be bidirectional, may further be connected to electromagnetic compatibility (EMC) filter, protection and precharge circuit 140. Moreover, EMC filter, protection and precharge circuit 140 may further comprise EV cable connection 160. Power converter 100 known in the art may further comprise power conversion controller 150, which may communicate with battery management system (BMS) 185 associated with EV battery 195 to establish a connection between power converter 100 and EV 180 and may be operable to control at least one AC-to-DC power conversion module 130, allowing to transfer power between power conversion circuit and EV battery 195.

It may be appreciated by a person skilled in the art that BMS 185 may comprise or be connected to a separate charge controller. Charge controller may also handle the power flow between a power converter and EV battery 195 of EV 180.

FIG. 1B, schematically illustrates flowchart 100' of known in the art power converter operation, which may be used to charge or discharge EV battery 195. At step S101, power converter 100 may be connected to EV 180 through EV cable connection 160, allowing to establish communication between BMS 185 associated with EV battery 195 and power conversion controller 150 of power converter 100 (see step S102).

Furthermore, BMS 185 may check a type of EV cable connection 160 (i.e., perform a "handshake") in order to ensure physical and electrical compatibility. BMS 185 may send to power conversion controller 150 a charger voltage command indicating a cable check voltage value (see step S103). In some protocols, a cable check voltage value may be requested prior to requesting a target charge voltage value. In this case, the charger is requested to present what normally would be the maximum DC charging voltage. BMS 185 may detect the requested voltage and confirms that the charge cable was able to handle the high voltage. If the cable check fails, connection to EV battery 195 of EV 180 may be aborted by BMS 185.

Then, in step S104, power converter 100 may provide to BMS 185 a voltage value matching the cable check voltage value of charger voltage command issued by BMS 185, in order to check compatibility between EV cable connection 160 of power converter 100 and EV battery 195 of EV 180.

Furthermore, power conversion controller 150 may receive and process the charge voltage command (see step S105), which may match the voltage of EV battery 195, and then may control at least one AC-to-DC power conversion module 130 of power converter 100 to provide requested DC power at indicated target voltage value to EV 180 (see step S106). Furthermore, BMS 185 may sense the voltage value of DC power provided at the EV power terminals of the connector of EV cable communication 160 connected to EV 180 and may further confirm that the voltage value matches the voltage of EV battery 195 (see step S107). It may be appreciated by a person skilled in the art that if the voltage value of DC power matches the voltage value of EV battery 195 requested by BMS 185, the latter may issue a command to close contactors 198 located on the EV side (see step S108).

Furthermore, once physical connection between power converter 100 and EV battery 195 has been established, power conversion controller 150 may receive from BMS 185 a charge current command indicating a target current value, at which EV battery 190 may be required to be charged (see step S109). It may be appreciated that power conversion controller 150 may further control AC-to-DC power conversion module 130 of power converter 100 to either provide DC power to EV battery 195 at a requested target current value or to drain DC power from EV battery 195 in order to convert it to AC power, which may then be supplied to electrical loads 115 or power main supply 110 (see step S110). Once a desired level of charging/discharging has been achieved, EV cable connection 160 may be disconnected from EV 180 (see step S111).

FIG. 2A schematically illustrates an embodiment of bidirectional power converter 200 comprising dark start precharge circuit 170, which may be used to allow power transfer between at least one bidirectional AC-to-DC power conversion module 130 and EV battery 195, i.e., may allow to draw DC power from EV battery 195 in case of the power outage. It may be appreciated that AC-to-DC power conversion stage 125 may comprise an AC port located on the AC side and at least one DC port on the DC side. Therefore, when no AC power is available at the AC port of at least one AC-to-DC power conversion module 130, i.e., when a home is in off-grid mode, dark start precharge circuit 170 may be used to enable drawing DC power from EV battery 195 and supply it to electrical loads 115. Furthermore, dark start precharge circuit 170 may draw DC power from an auxiliary battery 175, which may have been charged using AC-to-DC power converter 176, which may be connected, for example, to a power distribution line located between grid interface 120 and at least one AC-to-DC power conversion module 130.

It will be understood that auxiliary battery 175 can be a dedicated battery as described above or a suitable battery source such as, for example, a stationary storage battery, an uninterruptable power supply (UPS) battery or a low voltage supply from the EV.

Furthermore, it may be appreciated by a person skilled in the art that that dark start precharge circuit 170 may be controlled by power conversion controller 150 or by a separate controller (not shown).

It may further be appreciated by a person skilled in the art that at least one bidirectional AC-to-DC power conversion module 130 may comprise AC-to-DC power conversion stage 125, which may be followed by DC-to-DC power conversion stage 145. Furthermore, DC-to-DC power conversion stage 145 may comprise a first DC side and a second DC side, wherein at least one DC port is located on the second DC side of DC-to-DC power conversion stage 145.

It may further be appreciated that DC link and bus capacitors 135 may be connected to the DC side of AC-to-DC power conversion stage 125 and first DC side of DC-to-DC power conversion stage 145. More specifically, AC-to-DC power conversion stage 125 may be used to charge DC link and bus capacitors 135, when at least one bidirectional AC-to-DC power conversion module 130 operates in a rectifier mode, and DC-to-DC power conversion stage 145 (i.e., when bidirectional AC-to-DC power conversion may be used to charge DC link and bus capacitors when at least one AC-to-DC power conversion module 130 operates in an inverter mode.

Furthermore, the second DC side of DC-to-DC power conversion stage 145 may be connected to EMC filter, protection and precharge circuit 140, which is schematically illustrated in greater detail in FIG. 2B. It may be appreciated by a person skilled in the art that, in this embodiment and in alternative embodiments, EMC filter, protection and precharge circuit 140 may help to safeguard both the power converter and EV battery 195 from dangerous electrical conditions, i.e., allowing to ensure that power converter operates within safe voltage limits, prevents excessive current flow that could damage power converter or EV battery 195, etc. EMC filter, protection and precharge circuit 140 may further comprise an EV cable connection 160. It may be appreciated by a person skilled in the art that DC-to-DC power conversion stage 145 may also be linked directly to EV cable connection 160. The latter may be allowing power conversion controller 150 to receive EV BMS communication, which data may include a charge current (or voltage) command, specifying the target charging parameter, e.g., charge current, which should be supplied by at least one bidirectional AC-to-DC power conversion module 130 to enable safe and efficient charging of EV battery 195 according to battery's state of charge (SOC), temperature, and safety limits. Based on requirements of EV battery 195, at least one bidirectional AC-to-DC power conversion module 130 may adjust its output DC voltage to match the target voltage provided by a charge voltage command. It may be appreciated that a charge voltage command may be adjusted dynamically to optimize battery charging efficiency and prevent battery overcharging. It may further be appreciated that when at least one bidirectional AC-to-DC power conversion module 130 operates in rectifier mode, DC-to-DC power conversion stage 145 may be used to tune DC power supplied by DC link and bus capacitors 135.

FIG. 2B illustrates a circuit 200' of power converter 200 shown in FIG. 2A, schematically illustrating a more detailed view of EMC filter, protection and precharge circuit 140, dark start precharge circuit 170, and EV 180.

EMC filter, protection and precharge circuit 140 may comprise separate EMC filter circuit 142 (which may be connected to DC-to-DC power conversion stage 145 through the positive high-voltage line (HV+) and negative high-voltage line (HV−), which are reserved for positive DC voltage (DC+) and negative DC voltage (DC−), respectively), protection circuit 144, and precharge circuit 146. The latter may further comprise main contactors 148a, 148b and precharge contactors 147a, 147b, each of which may be connected in series with resistor 149a, 149b, respectively, to prevent inrush current. Precharge contactors 146 and main contactors 148 and may be placed in series with HV+ and HV−, respectively. Furthermore, HV+ and HV− which may further be connectable to EV cable connection 160 through terminals 162a, 162b, respectively.

Dark start precharge circuit 170 may comprise a low-voltage input DC port, which may be used to receive power from a low-voltage DC power source, e.g., auxiliary battery 175, which, for example, in this embodiment and other alternative embodiments, may be provided by 12V or 48V battery. Dark start precharge circuit 170 may further comprise step-up DC-to-DC power conversion stage 165, which may be provided by a boost, a flyback, a push-pull, or any other suitable DC-to-DC power converter and may be used to step-up the low-voltage DC power received from auxiliary battery 175 to match the target voltage provided by charge voltage command received from BMS 185. It may be appreciated that step-up DC-to-DC power conversion stage 165 may be operated using power conversion controller 150.

Moreover, EV 180, apart from comprising EV battery 195 and BMS 185 associated with it, may comprise contactors 198a, 198b associated with the positive DC terminal 195a and negative DC terminal 195b, respectively. It may be appreciated that, when the DC voltage at the DC terminals, i.e., EV DC power terminals 188a, 188b, connectable to HV+ and HV−, respectively, matches the target voltage included in charge voltage command provided by BMS 185 (e.g., voltmeter 210a may be used to provide DC voltage measurement on the EV side to BMS 185), the latter may issue a command to close contactors 198a, 198b, allowing for power transfer between power converter 200 and EV battery 195. It may be understood that such a behavior of an EV 180 may apply to all alternative embodiments mentioned in this description (see embodiments shown in FIGS. 3B, 4B, and 5B).

It may be appreciated that, when the output of dark start precharge circuit 170 may further be supplied directly to EV 180 through cable connection 160, while avoiding passing through EMC filter, protection and precharge circuit 140. Thus, the output of step-up DC-to-DC power conversion stage 165 may further be connected to DC+ and DC− terminals 149a, 149b following EMC filter, protection and precharge circuit 140, which may allow supplying the output DC voltage of step-up DC-to-DC power conversion stage 165 directly to EV DC input/output terminals 188a, 188b. In order to measure the voltage provided by step-up DC-to-DC power conversion stage 165, a voltmeter 210b, which may be integrated into an EV may be used to measure the voltage at the positive and negative DC input/output terminals 188a, 188b. Additionally, a voltmeter 210b may be optionally connected to the terminals 162a, 162b corresponding to the side of EV cable connection 160 connectable to EMC filter, protection and precharge circuit 140, and it may be used to measure the output DC voltage provided by step-up DC-to-DC power conversion stage 165 at the terminals 149a, 149b. It may be appreciated that if the output DC voltage meets the target voltage requested by BMS 185, it may further be supplied to EV DC input/output terminals 188a, 188b.

Furthermore, FIG. 2C schematically illustrates a detailed view of at least one bidirectional AC-to-DC power conversion module 130. It may be appreciated by a person skilled in the art that DC-to-DC power conversion stage 145 may be galvanically isolated and may comprise isolation transformer 144, which may be connected between DC to high-frequency AC power conversion stage 142 and high-frequency AC to DC power conversion stage 146. It may be appreciated that isolation transformer 144 may also be placed between mains power supply 110 and AC-to-DC power conversion module 130 to provide galvanic isolation. However, using a high-frequency isolation transformer 144 as a part of DC-to-DC power conversion stage 145 may allow to drastically reduce its size and weight, leading to more compact design of bidirectional power converter 200. It will be further understood by the person skilled in the art that other alternative embodiments of the power converter described herein may comprise at least one bidirectional AC-to-DC power conversion module 130 schematically illustrated in FIG. 2C.

It may further be appreciated by a person skilled in the art that presence of DC-to-DC stage 145 of power converter 200 or any other power converted disclosed herein may be optional.

FIG. 3A schematically illustrates an alternative embodiment of a power converter described herein, i.e., a power converter 300, which may comprise dark start precharge circuit 170 connectable to EMC filter, protection and precharge circuit 140, allowing to filter the output DC voltage provided by step-up DC-to-DC power conversion stage 165 of dark start precharge circuit 170 before supplying it to EV battery 195.

Furthermore, FIG. 3B illustrates a circuit 300' of power converter 300 shown in FIG. 3A, schematically illustrating a more detailed view of EMC filter, protection and precharge circuit 140, dark start precharge circuit 170, and EV 180. It may be appreciated that comparatively to an embodiment of the power converter illustrated in FIGS. 2A and 2B, in power converter 300, the output DC power may be supplied from step-up DC-to-DC power conversion stage 165 of dark start precharge circuit 170 to terminals 149a, 149b associated with HV+ and HV−, respectively, and then pass through EMC filter, protection and precharge circuit 140, which may optionally be followed by voltmeter 210b, connectable between terminals 162a, 162b. In this case, first, precharge contactors 147a, 147b of precharge circuit 146 may be closed, while main contactors 148a, 148b remain open, allowing to limit current flow using respective resistors 149a, 149b. Then, main contactors 148a, 148b close, which may allow for a direct connection between power converter 300 and EV battery 195.

FIG. 4A schematically illustrates another alternative embodiment of the power converter described herein, i.e., power converter 400. In this alternative embodiment, step-up DC-to-DC power conversion stage 165 (see, for example, FIGS. 2B and 3B) of dark start precharge circuit 170 may be provided by DC-to-DC power conversion stage 145, which may then be followed by EMC filter, protection and precharge circuit 140. It may be appreciated that DC-to-DC power conversion stage 145 may be operated by power conversion controller 150.

As further shown in FIG. 4B, schematically illustrating a detailed view 400' of power converter 400, the low-voltage DC power provided by an auxiliary battery 175 may be received at low-voltage input DC port 155 and then be directly supplied to DC-to-DC power conversion stage 145 of at least one AC-to-DC power conversion module 130, allowing to step up the low-voltage DC power received from an auxiliary battery 175 to match the target voltage provided by a charge voltage command received from BMS 185 at power conversion controller 150. As previously illustrated in FIG. 2B, DC output voltage measurement may be performed by using voltmeter 210a integrated into an EV 180, and/or by using additional voltmeter 210b (see FIGS. 2B and 3B).

FIG. 5A schematically illustrates another alternative embodiment of the power converter described herein. In this alternative embodiment, power converter 500 may comprise dark start precharge circuit 170, which may be used to charge DC link and bus capacitors 135.

As further shown in FIG. 5B, schematically illustrating a detailed view 500' of power converter 500, dark start precharge circuit 170 may comprise step-up DC-to-DC power conversion stage 165 connected to low-voltage input DC port 155, which may be receiving power from auxiliary battery 175. The boosted DC output power provided by step-up DC-to-DC power conversion stage 165 may then be supplied to DC link and bus capacitors 135. Once, DC link and bus capacitors have been charged to a desired voltage value, DC-to-DC power conversion stage 145 may then be operated by power conversion controller 150 and may be used to adjust that DC voltage in order to match the target voltage provided by a charge voltage command. As previously illustrated in FIGS. 2B and 4B, DC output voltage measurement may be performed by voltmeter 210a integrated into an EV 180, and/or by additional voltmeter 210b (see FIGS. 2B and 3B).

As illustrated in FIG. 6, it may be appreciated by a person skilled in the art that, alternatively, bidirectional power converter 200/300/400/500 may be provided by inverter 600, and at least one bidirectional AC-to-DC power converter 130 may be provided by at least one inverter module 130', for converting DC power from an EV to AC power, which may then be used to power home AC loads 115 or be provided to mains power supply 110. It may further be appreciated at least one inverter module 130' of inverter 600 may have an AC port connectable to mains power supply 110 in a grid-tie or island mode, and at least one DC port connectable to at least one EV cable connection 160. Inverter 600 may further comprise dark start precharge circuit 170, which may be connected to auxiliary battery 175. Dark start precharge circuit 170 may be used for delivering DC voltage delivered from auxiliary battery 175 to at least one DC port of at least one inverter module of inverter 600.

It may further be appreciated that inverter 600 may be connected to a power conversion controller 150 having an interface for receiving charge data from battery management system (BMS) 185 associated with EV storage battery 195 of EV 180. Power conversion controller 150 may be operatively connected to at least one inverter module of inverter 600. When AC power is not available at an AC port of at least one inverter module (e.g., during the power outage), power conversion controller 150 may control dark start precharge circuit 170 to deliver to at least one DC port at least one voltage corresponding to a charge data to establish a connection to EV 180.

It may be appreciated by a person skilled in the art that, similarly to the embodiments of bidirectional power converter (for example, as illustrated in FIGS. 2B, 3B, and 5B), dark start precharge circuit 170 shown in FIG. 6 may also comprise step-up DC-to-DC power conversion stage 165, which may be used to boost the DC voltage derived from auxiliary battery 175 to a target voltage required by BMS 185 to establish a physical connection between EV cable connection 160 and EV battery 195 of EV 180.

Furthermore, in response to detecting that the connection to EV 180 is established, power conversion controller 150 may stop dark start precharge circuit 170 from delivering DC voltage derived from auxiliary battery 175 and may control at least one inverter module of inverter 130' to convert DC power from EV 180 to AC power, which may then be supplied either to electrical loads 115 or to mains power supply 110.

FIG. 7 schematically illustrates flowchart 700 of operation of bidirectional power converter 200/300/400/500 (when functioning in as an inverter), and inverter 600, which may be used to discharge EV battery 195. It may further be appreciated that, for the purpose of describing FIG. 7, bidirectional power converter 200/300/400/500 and inverter 600 may be referred to as "a power converter".

At step S701, an AC port of the power converter may be connected to main power supply 110. Then, at step S702, at least one DC port of at least one power conversion module (i.e., bidirectional AC-to-DC power conversion module 130 of bidirectional power converter 200/300/400/500, or inverter module 130' of inverter 600) may be connected to EV 180 through EV cable connection 160, allowing to establish communication between BMS 185 associated with EV battery 195 and power conversion controller 150 of power converter (see step S703).

Furthermore, BMS 185 may check a type of EV cable connection 160 (i.e., perform a "handshake") in order to ensure physical and electrical compatibility. In some protocols, a cable check voltage may be requested prior to requesting a target charge voltage value. In this case, the charger is requested to present what normally would be the maximum DC charging voltage. BMS 185 detects the requested voltage and confirms that the charge cable was able to handle the high voltage. If the cable check fails, connection to EV battery 195 of EV 180 may be aborted by BMS 185.

As further illustrated in FIG. 7, dark start precharge circuit 170 may be connected to at least one DC port of the power converter, for delivering DC power to at least one DC port of the power converter (see step S704).

Furthermore, BMS 185 may send to power conversion controller 150 a charge data indicating a target voltage value, at which EV battery 190 may be required to be charged (see step S705). Then, power conversion controller 150 may process the charge data and then may control dark start precharge circuit 170 to deliver at least one voltage corresponding to charge data (i.e., corresponding to the target voltage value) to at least one DC port of the power converter (see step S706), which is useful when no AC power is present at the AC port of the power converter (e.g., during the power outage).

It may further be appreciated by a person skilled in the art that the voltage derived from auxiliary battery 175 may be stepped-up to match the target voltage value (i.e., at least one voltage) of charge data received by power conversion controller 150 from BMS 185, for example, using DC-to-DC power conversion stage 145 of power converter (as illustrated, for example, in FIGS. 4A), or step-up DC-to-DC power conversion stage 165 of dark start precharge circuit 170 (as illustrated, for example, in FIGS. 2B, 3B, 5B, and 6).

Once target voltage value has been detected by BMS 185 at EV DC terminals, BMS 185 may sense the voltage value of DC power provided at the power terminals of the connector of EV cable communication 160 connected to EV 180 and issue a command to close contactors 198 located on the EV side (for example, see FIG. 2B, 3B, 4B or 5B) and establish a physical connection between the power converter and EV battery 180 (see step S707) via EV cable connection 160. Once that connection has been established, power conversion controller 150 may issue a command to stop dark start precharge circuit 170 from delivering DC voltage derived from auxiliary battery 175 to at least one DC port of the power converter (see step S708).

Once a connection between power converter and EV battery has been established, power conversion controller 150 may further receive from BMS 185 a charge current command indicating a desired charge current value (see step S709). Power conversion controller 150 may further control the power converter to allow for DC power transferring between the power converter EV battery 195 of EV 180 (see step S710). Power conversion controller 150 may to convert DC power from EV battery 195 of EV 180 to AC power that then may be supplied to electrical loads 115 or mains power supply 110 (for example, see FIGS. 2A, 3A, 4A, 5A, and 6).

What is claimed is:

1. A bidirectional power converter for converting AC power to DC charging power for an electric vehicle (EV) and for converting DC power from the EV to AC power, the bidirectional power converter comprising:

at least one bidirectional AC-to-DC power conversion module having an AC port connectable to mains power supply in a grid-tie or island mode and at least one DC port connectable to at least one EV cable connection;

a dark start precharge circuit for delivering DC voltage derived from an auxiliary battery to said at least one DC port in the absence of AC power at said AC port; and a power conversion controller having an interface for receiving charge data from a battery management system (BMS) associated with an electric power storage battery of said EV, said power conversion controller operatively connected to said at least one bidirectional AC-to-DC power conversion module for:

(1) when said AC power is available at said AC port, controlling said at least one bidirectional AC-to-DC power conversion module to deliver to said DC port at least one voltage according to said charge data received from said BMS so as to establish a DC power connection to said EV and then begin charging or discharging said electric power storage battery of said EV; and (2) when said AC power is not available at said AC port, controlling said dark start precharge circuit to deliver to said DC port at said at least one voltage corresponding to said charge data at said at least one DC port to establish a DC power connection to said EV and, in response to detecting that the DC power connection to said EV is established, stopping said dark start precharge circuit from delivering said DC voltage derived from the auxiliary battery, and controlling said at least one bidirectional AC-to-DC power conversion module to convert DC power from said EV to AC power.

2. The power converter as defined in claim 1, wherein said at least one bidirectional AC-to-DC power conversion module further comprises a DC-to-DC power conversion stage.

3. The power converter as defined in claim 2, wherein said DC-to-DC power conversion stage comprises galvanic isolation.

4. The power converter as defined in claim 1, wherein said dark start precharge circuit comprises a low-voltage input DC port for receiving a low-voltage DC power from said auxiliary battery.

5. The power converter as defined in claim 1, wherein dark start precharge circuit comprises a step-up DC-to-DC power conversion stage for stepping up said low-voltage DC power received from said auxiliary battery to match a target voltage corresponding to said charge data.

6. The power converter as defined in claim 2, wherein said dark start precharge circuit comprises a low-voltage input DC port for receiving a low-voltage DC power from said auxiliary battery, said low-voltage input DC port being connectable to said step-up DC-to-DC power conversion stage for boost and delivery to said at least one DC port.

7. The power converter as defined in claim 2, wherein said DC-to-DC power conversion stage comprises a first DC side connectable to said AC-to-DC power conversion stage and a second DC side comprising said at least one DC port further connectable to said EV connection, and wherein a DC side of the AC-to-DC power conversion stage further comprises a connection to DC link and bus capacitors, said DC link and bus capacitors connectable to said first side of said DC-to-DC power conversion stage.

8. The power converter as defined in claim 7, wherein said DC power provided by said step-up DC-to-DC power conversion stage is used to charge said DC link and bus capacitors allowing to provide said target voltage at said DC port of said at least one bidirectional AC-to-DC power conversion module.

9. The power converter as defined in claim 1, wherein said at least one DC port of said bidirectional AC-to-DC power conversion module further comprises a connection to an electromagnetic compatibility (EMC) filter, protection and precharge circuit.

10. The power converter as defined in claim 9, wherein said dark start precharge circuit is connectable to said EMC filter, protection and precharge circuit for filtering said DC power provided by said step-up DC-to-DC power conversion stage before providing said DC power to said EV.

11. A method for delivering power between an electric power storage battery of an electric vehicle (EV) and at least one power conversion module of a power converter, the method comprising:

connecting an AC port of said at least one power conversion module to mains power supply, said mains power supply is in a grid-tie or island mode;

connecting at least one DC port of said at least one power conversion module to at least one EV cable connection;

connecting a dark start precharge circuit to at least one DC port of said power converter for delivering DC voltage delivered from an auxiliary battery to said at least one DC port;

receiving at an interface of a controller charge data from a battery management system (BMS) associated with said electric power storage battery of said EV, said controller operatively connected to said at least one power conversion module for, when said AC power is not available at said AC port, controlling said dark start precharge circuit to deliver to said at least one DC port at said at least one voltage corresponding to said charge data at said at least one DC port to establish a DC power connection to said EV and, in response to detecting that the DC power connection to said EV is established, stopping said dark start precharge circuit from delivering said DC voltage derived from the auxiliary battery, and controlling said at least one power conversion module to convert DC power from said EV to AC power.

12. The method as defined in claim 11, wherein controlling said dark start precharge circuit further comprises controlling a step-up DC-to-DC power conversion stage of said dark start precharge circuit using said controller for stepping up said DC power provided by said auxiliary battery, wherein the controller is a power conversion controller of the power converter.

13. The method as defined in claim 11, wherein said controlling said dark start precharge circuit further comprises controlling a DC-to-DC power conversion stage of said at least one power conversion module using said controller for stepping up said DC power derived from said auxiliary battery, said DC-to-DC power conversion stage is galvanically isolated and comprises a first DC side connectable to a DC side of said at least one power conversion module and a second DC side connectable to said at least one EV cable connection, and wherein the controller is a power conversion controller of the power converter.

14. The method as defined in claim 11, wherein said delivering said DC power at said target voltage corresponding to said charge data at said at least one DC port further comprises charging DC link and bus capacitors connected to said at least one DC port of said DC side of said at least one power conversion module using said step-up DC-to-DC power conversion stage of said dark start precharge circuit.

15. The method as defined in claim 14, further comprising providing said DC power stored in said DC link and bus capacitors to said DC-to-DC power conversion stage of said at least one power conversion module for further tunning allowing to achieve said target voltage corresponding to said charge data.

16. The method as defined in claim 11, further comprising providing said DC power to an electromagnetic compatibility (EMC) filter, protection and precharge circuit connected said at least one DC port of said at least one power conversion module.

17. The method as defined in claim 11, wherein said charge data issued by the BMS contains a charge voltage command, for establishing a connection between the EV and the power converter, and at least one charge current command, for transferring DC power between the EV and the power converter after the connection is established.

18. An inverter for converting DC power from an electric vehicle (EV) to AC power, the inverter comprising:

at least one inverter module having an AC port connectable to mains power supply in a grid-tie or island mode and at least one DC port connectable to at least one EV cable connection;

a dark start precharge circuit for delivering DC voltage derived from an auxiliary battery to said at least one DC port; and a controller having an interface for receiving charge data from a battery management system (BMS) associated with an electric power storage battery of said EV, said controller operatively connected to said at least one inverter module for, when said AC power is not available at said AC port, controlling said dark start precharge circuit to deliver to said DC port at said at least one voltage corresponding to said charge data at said at least one DC port to establish a DC power connection to said EV and, in response to detecting that the DC power connection to said EV is established, stopping said dark start precharge circuit from delivering said DC voltage derived from an auxiliary battery, and controlling said at least one inverter module to convert DC power from said EV to AC power.

\* \* \* \* \*